US007526088B2

(12) United States Patent
Cordes (10) Patent No.: US 7,526,088 B2
(45) Date of Patent: Apr. 28, 2009

(54) CODE GENERATOR AND DEVICE FOR THE SYNCHRONOUS OR ASYNCHRONOUS AND PERMANENT IDENTIFICATION OR ENCODING AND DECODING OF DATA OF ANY PARTICULAR LENGTH

(76) Inventor: René-Michael Cordes, Raiffeisengasse 3, A-2323 Mannswörth (AT)

( * ) Notice: Subject to any disclaimer, the term of this patent is extended or adjusted under 35 U.S.C. 154(b) by 532 days.

(21) Appl. No.: 10/506,435

(22) PCT Filed: Mar. 5, 2003

(86) PCT No.: PCT/AT03/00063

§ 371 (c)(1),
(2), (4) Date: Sep. 2, 2004

(87) PCT Pub. No.: WO03/075507

PCT Pub. Date: Sep. 12, 2003

(65) Prior Publication Data

US 2005/0105720 A1     May 19, 2005

(30) Foreign Application Priority Data

Mar. 5, 2002 (AT) ................................ A 338/2002

(51) Int. Cl.
*H04L 9/00* (2006.01)
(52) U.S. Cl. ...................................................... 380/46
(58) Field of Classification Search ................... 380/37, 380/44–46
See application file for complete search history.

(56) References Cited

U.S. PATENT DOCUMENTS

| 5,365,588 | A | * | 11/1994 | Bianco et al. ................. 380/42 |
| 5,428,614 | A | * | 6/1995 | Shaver ........................ 370/474 |
| 6,067,359 | A |  | 5/2000 | Shimada |
| 6,889,906 | B1 | * | 5/2005 | Matthewson ................. 235/493 |
| 6,966,017 | B2 | * | 11/2005 | Evans ......................... 714/718 |
| 2001/0033663 | A1 |  | 10/2001 | Ishimoto et al. |
| 2003/0051197 | A1 | * | 3/2003 | Evans ......................... 714/718 |
| 2003/0091185 | A1 | * | 5/2003 | Swindlehurst et al. ........ 380/44 |

FOREIGN PATENT DOCUMENTS

EP     0 782 069     7/1997

(Continued)

OTHER PUBLICATIONS

Kencheng Zeng, "Pseudorandom Bit Generators in Stream-Cipher Cryptography" IEEE 1999, pp. 8-17 and retrieved date: Sep. 10, 2007.*

(Continued)

*Primary Examiner*—Gilberto Barron, Jr.
*Assistant Examiner*—Samson B Lemma
(74) *Attorney, Agent, or Firm*—Nixon & Vanderhye, PC (57) ABSTRACT

A code generator includes a plurality of storage elements (such as flip flops) connected to form a code-producing series, wherein the output of the final storage element in the series in connected to the input of the first storage element in the series to form a circuit and outputs and inputs of the storage elements are recursively connected means of EXOR gates. The first input of at least one EXOR gate is connected to the output of a storage element disposed in the code-producing series, the second input thereof is connected to the output of another storage element disposed in the code-producing series, and the output thereof is connected to the input of the storage element which succeeds the storage element connected with the first input of the EXOR gate. The output of a storage element disposed in the code-producing series is connected to the input of an inverter and the output of the inverter is connected to the input of another storage element disposed in the series.

19 Claims, 5 Drawing Sheets

FOREIGN PATENT DOCUMENTS

| | | |
|---|---|---|
| EP | 0 913 964 | 5/1999 |
| JP | 10-320181 | 12/1998 |
| JP | 2000-101567 A | 4/2000 |
| JP | 2001-16197 A | 1/2001 |
| WO | 98/02990 | 1/1998 |
| WO | 99/16208 | 4/1999 |
| WO | 99/22484 | 5/1999 |
| WO | 01/05090 | 1/2001 |

OTHER PUBLICATIONS

Kencheng Zeng; "Pseudorandom Bit Generators in Stream-Cipher Cryptography"; Computer, IEEE Computer Society, Long Beach, CA, US, Bd. 24, Nr. 2, Feb. 1, 1991, pp. 8-17, XP000219462.

* cited by examiner

CODE GENERATOR AND DEVICE FOR THE SYNCHRONOUS OR ASYNCHRONOUS AND PERMANENT IDENTIFICATION OR ENCODING AND DECODING OF DATA OF ANY PARTICULAR LENGTH

This application is the US national phase of international application PCT/AT03/0063 filed 5 Mar. 2003, which designated the US and claims priority to AT Application No. A 338/2002 filed 5 March 2002. The entire contents of these applications are incorporated herein by reference.

BACKGROUND AND SUMMARY

The invention relates to a code generator with a plurality of storage elements connected in a code-producing series, e.g., flip-flops, wherein the output of the last storage element in the series is linked with the input of the first storage element in the series to form a circuit, and outputs and inputs of the storage elements are recursively interconnected with EXOR gates inserted.

Such code generators are used for encrypting and decrypting information via communications networks. In principle, all encryption methods utilize a code, even if the information to be coded is itself used as code. The better the code used for encryption is hidden, the more effective the encryption. The longer the code, the more difficult it is to decrypt. For example, an infinite code never has to be hidden, since it is never completely known. Any code that does not repeat prior to the end of the information to be encrypted is functionally regarded as infinite. The advantage to a functionally infinite code is that the encryption and decryption process itself can be realized in a conceivably simple manner with a single EXOR or EXNOR operation. The disadvantage to a functionally infinite code is that it cannot be transmitted; it must be generated.

There is a simple way to generate a functionally infinite code by linking the two inputs of an EXOR gate with two outputs of series-connected storage elements, e.g., a shift register, and recursively interconnecting the output of the EXOR gate with the input of the shift register.

The result is a code sequence with a maximum length of $$L_c = 2^n - 1$$

($L_c$=length of code sequence; n=number of code-generating, series-connected storage elements)

bits.

The disadvantage to this code generator is that the structure of the generator can easily be inferred from the code sequence, so that it can be regenerated with an identically designed generator. The following patents represent attempts to further encrypt these code sequences with other processes, so that they can no longer be reconstructed: US 2001033663, WO 01/05090, WO 99/22484, WO 99/16208, JP10320181, WO98/02990 and EP 0782069. The code generators disclosed in these publications share in common that resonance effects shorten the length of the produced code. There also exist a number of pseudo-random-check generators, for example those described in JP 2000-101567, JP 2001-016197, EP 1999-0913964 or EP 1997-0782069. These code generators work with variables, wherein a mathematical, nonlinear conversion algorithm is used to calculate a code sequence from these variables. This is done to reduce the ability to recalculate using high and highest mathematical functions. These systems share in common that they use a mathematical functional unit that has a multi-bit input, adjacent to which is the output variable located in a code memory, and a one-bit output, from which the serial code sequence is read out, which has a negative effect on the maximum achievable code generating speed. Another object of high and heist mathematics is to find simple solutions to complex formulas, which is why the risk of discovering a simple solution to however complex a mathematical function can never be entirely precluded, and of course cannot be weighed.

The object of this invention is to provide a device for generating the most varied and long code sequences possible, wherein the goal is to get by with the least number of circuit elements possible. The code generator is to be suited for simultaneously encrypting high-frequency binary data streams over prolonged timeframes with the use of binary bit operations, wherein even the output code is to remain secret.

In order to achieve this object, this invention essentially proceeds from a code generator of the kind mentioned at the outset, wherein at least one EXOR gate is provided, whose first input is connected with the output of a storage element located in the code-producing series, whose second input is connected with the output of another storage element located in the code-producing series, and whose output is connected with the input of the storage element following the storage element connected with the first input of the EXOR gate in the code-producing series, and that the output of a storage element located in the code-producing series is connected with the input of an inverter, and the output of the inverter is connected with the input of another storage element arranged in the series. In this case, both the structure of the code generator and the algorithm running therein are known.

However, the structure is configured in such a way that it can generate a high enough number of different codes of sufficient length as to render highly improbable the discovery of the respectively used code along with the currently produced spot in the code sequence. The code cannot be regenerated if the generator can generate so many different codes that a segment of individual code cannot be used to infer its continuation. The generator generates the code sequence at the lowest possible level of bit operations. Variables are not used as the basis for calculating the code sequences, but rather only the states of individual storage elements, e.g., flip-flops or shift registers interconnected in a series. This yields the highest possible efficiency relative to the number of used switching elements on the one hand, and to the overall length of the generatable code sequences and number of generatable different codes. In addition, this ensures that the code generator can perform at the highest possible production rate.

According to the invention, the code sequence generated by the code generator is changed by inserting another EXOR gate between two storage elements located in the code-producing series, whose one input is connected to the output of a first storage element, while the second input is supplied by the output of some other storage element located in the series, and, finally, the input of the storage element connected to the first storage element in the conducting direction of the series is supplied with the output of the EXOR gate.

To generate a code proceeding from an empty storage element series that has a maximum length relative to the number of used storage elements, a single inverter must be present in the entire closed series of storage elements. The function of the inverter can of course be combined with the function of the EXOR gate in one switching element, e.g., by means of an EXNOR gate.

In order to now program different codes, the recursive function of the EXOR gate(s) is designed so that it can be enabled and disabled depending on internal code memory content. To this end, the invention is modified in such a way as to connect an AND gate in the line connecting the second input of the at least one EXOR gate and the output of the other storage element located in the code-reproducing series, so that the output of the AND gate is connected with the second input of the EXOR gate, the first input of the AND gate is connected with the output of the other storage element located in the code-producing series, and the second input of the AND gate is connected with the output of a storage element used for programming purposes.

The state of the respective storage element used for programming purposes hence determines whether the respective EXOR gate is enabled or disabled. As a consequence, such a storage element is referred to as a code-programming storage element.

To make the code more variable, a plurality of EXOR gates is preferably provided, whose first input is supplied by a respective output of one of the storage elements located in the code-producing series, and whose second input is supplied by the respective output of another storage element located in the code-producing series, which is spaced a number of storage elements in the conducting direction of the series away from the storage element respectively connected with the first input, which respectively corresponds to a different prime number that is greater than 1 and does not constitute a partial amount of the overall number of series-connected storage elements.

As a result, the resonance effects do not shorten the length of the produced code. In this case, a corresponding structure for the integration of varying code-changing EXOR gates ensures that no such partial sections of the storage element series that make up a percentage or multiple of another partial section or the entire section of the circuit exist between the two storage elements, which are situated in the code-producing series comprising a closed circuit and have the two inputs of the EXOR gates. The most effective way to realize this is to have the number of storage elements located in these partial sections and their overall number be prime numbers.

In a preferred further development of the invention, the internal code memory content is generated in such a way that not even the user knows the content of the internal code memory. This further complicates code decryption. To this end, the design preferably incorporates a plurality of code-programming storage elements that are respectively assigned to an AND gate and an EXOR gate and connected in a code-programming series comprising a closed circuit, and provides at least one EXOR gate, whose first input is connected with the output of a storage element located in the code-programming series, whose second input is connected with the output of another storage element located in the code-programming series, and whose output is connected with the input of the storage element following the storage element connected with the first input of the EXOR gate in the code-programming series. The states of the code-changing EXOR gates are hence programmed with the AND gates from a separate storage element series, which is recursively interconnected using at least one EXOR gate, in the same way as happens in the code-producing storage element series. In this case, programming takes place by providing the code-programming storage element series with a program clock, wherein a plurality of code generators can easily be programmed to an identical code, if, as described in a preferred embodiment, the code generator has at least one connection for at least a second, identically structured code generator, so that both code generators can be supplied with the same program clock at the same time.

The invention further relates to a device for sending and receiving encrypted information with at least two code generators, wherein the code generators each have a connection for simultaneously supplying the code-programming storage elements of all interconnected code generators with the same program clock, so that the code-programming storage elements of all interconnected code generators simultaneously run through all possible state combinations, and are provided with the same programming when the code generators are simultaneously separated from the program clock.

In a preferred further development, the various code-programming EXOR gates are again enabled and disabled in terms of their program-influencing action by a programming storage element series comprised of additional storage elements, so that not all possible programming states need to be run through while programming, as a result of which the state of the code after programming cannot be inferred even by approximation from the programming time duration.

BRIEF DESCRIPTION OF THE DRAWINGS

The invention will be explained in greater detail below based on exemplary embodiments shown on the drawing.

Shown on FIG. 1 is a principal circuit diagram for programmable recursive code generation.

DETAILED DESCRIPTION OF EXAMPLE EMBODIMENTS

Figure 1:
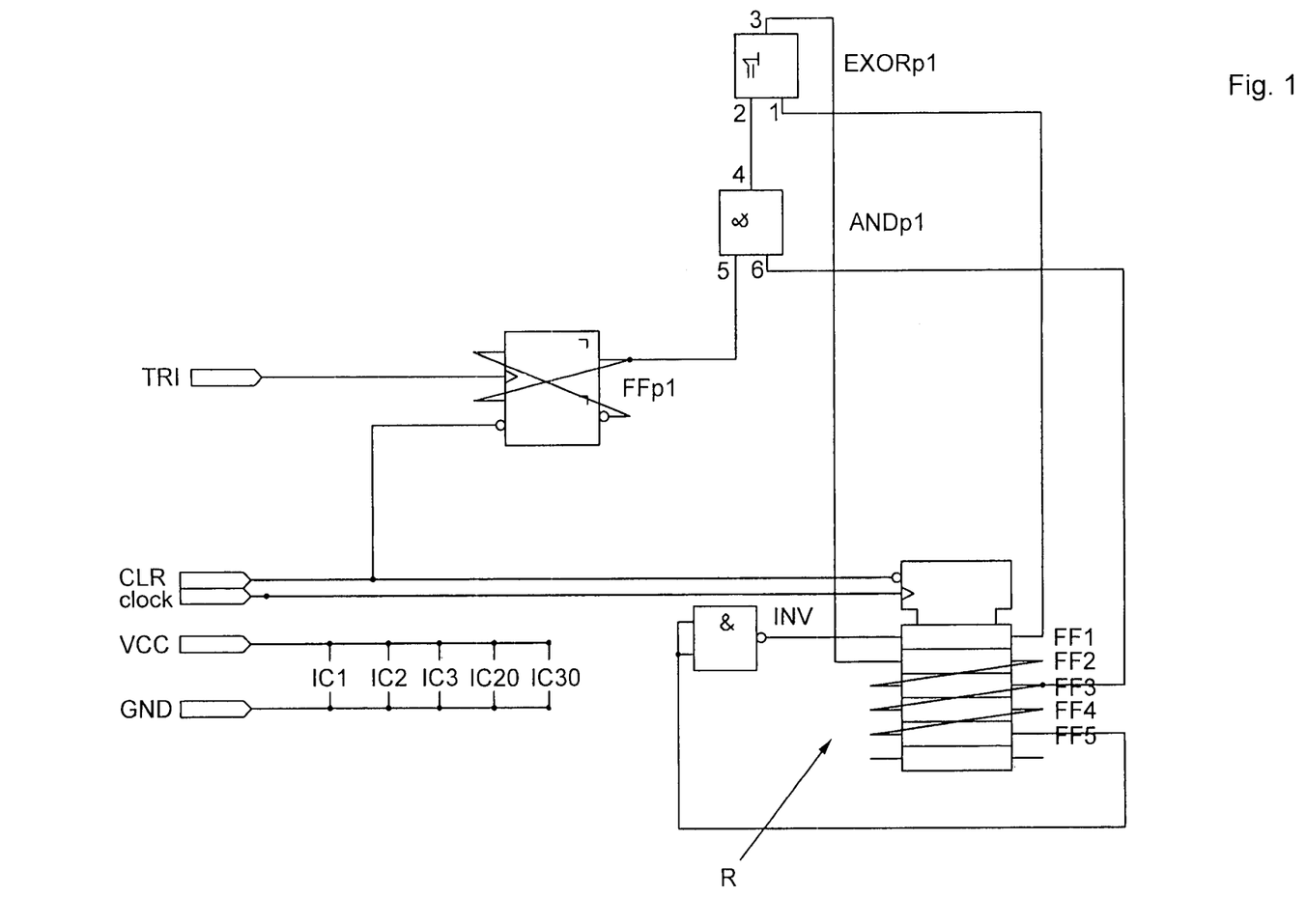

FIG. 1 shows a principal circuit diagram in which five storage elements, i.e., the flip-flops $FF_{1,2,3,4,5}$ coupled into a code-producing series R, an EXOR gate $EXOR_{p1}$, an AND gate $AND_{p1}$ and an inverter INV are interconnected, specifically in such a way as to connect in series, i.e., recursively, the input 2 of the EXOR gate $EXOR_{p1}$ with the output 4 of the AND gate $AND_{p1}$, its one input 5 with an output of one of the storage elements $FF_{pl}$ used for programming purposes, and its other input 6 with the output of the storage element $FF_3$ located in the code-producing series, and its other input 1 of the EXOR gate $EXOR_{pi}$ with the output of the storage element $FF_1$ located in the code-producing series R, and the output 3 of the EXOR gate $EXOR_{pi}$ with the input of the storage element $FF_2$, and the output of the storage element $FF_5$ with the inputs of the inverter INV, and the output of the INV in turn with the input of the next storage element $FF_1$ in the conducting direction. A code sequence is generated with this circuit, proceeding from a series R of completely empty storage elements $FF_{1,2,3,4,5}$. At least three clocks pass before the code repeats. The individual switching elements can be realized with commercially available modules. For example, a type 74HC174 IC can be used for the series-connected storage elements $FF_{1,2,3,4,5}$, as can an IC 74HC08 for the AND gate $AND_{p1}$, an IC 74HC386 for the EXOR gate $EXOR_{pl}$, an IC 74HC00 for the inverter INV, and an IC 74HC107 for memory module $FF_{pl}$.

Figure 2:
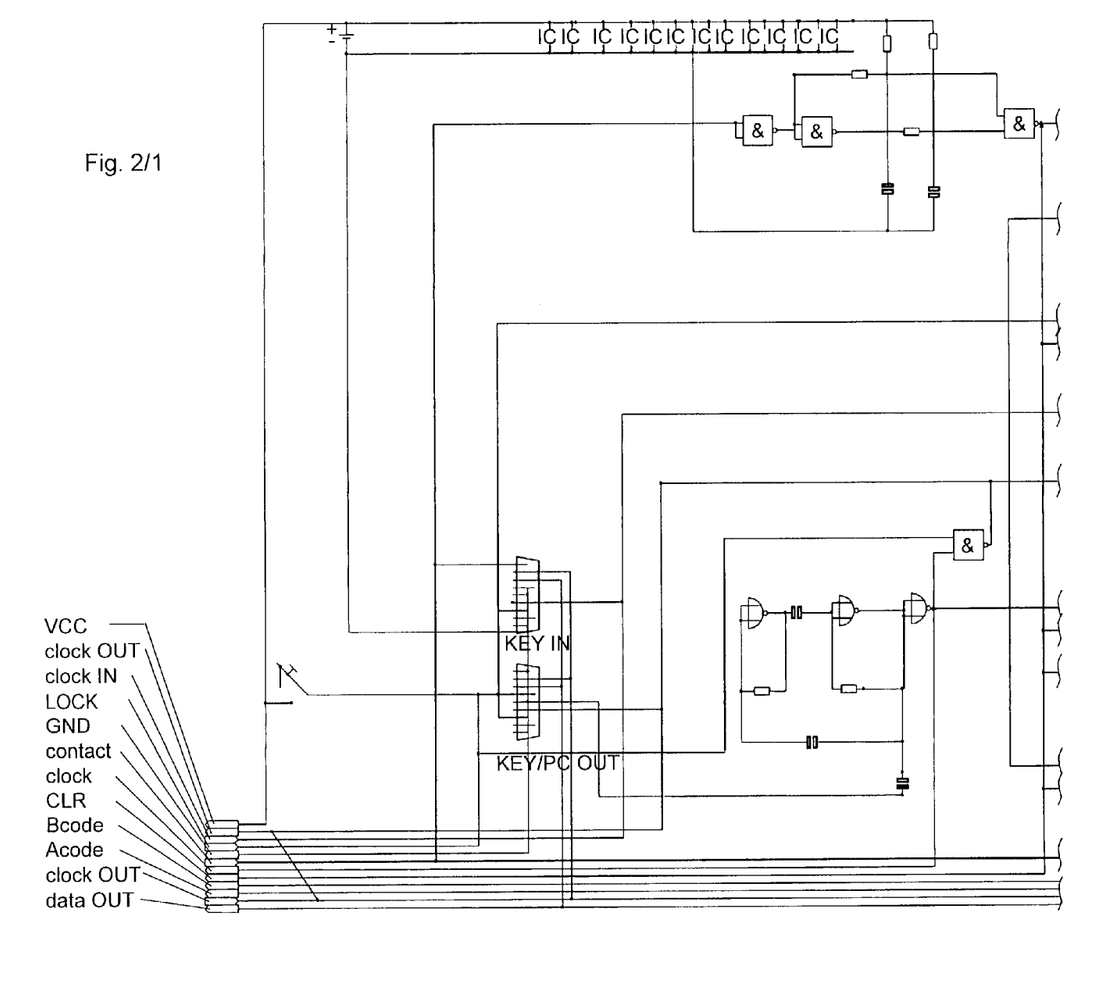
FIG. 2 is a general example of a circuit for a code-generator based functional unit, with which an encrypted connection can be established between two computers.

The series shown on FIG. 1 can of course be lengthened, e.g., yielding a lengthened series R as shown on FIG. 2.

In this case, a number of continuous, series-connected storage elements can also be realized in the form of shift registers $SRG_1$, $SRG_2$, ... The length of the code doubles per added storage element, so that the code length is calculated as follows:

$$L_c = 2^n - 1$$

($L_c$=length of code sequence; n=number of code-generating, series-connected storage elements)

If this unit is operated with a specific clock, the following holds true for the duration of the code:

$$T_c = \frac{2^n - 1}{f_c}$$

($T_c$=time elapsed until code repeats; $f_c$=code generation clock frequency)

At less than 50 storage elements at a code generating clock frequency of 384,000 bits/sec, the code runs longer than one year without the sequence repeating, so that a signal to be encrypted can simultaneously be sent over a dedicated line encrypted for just as long a time, and decrypted to enable live transmission for just as long a time.

If, assuming a corresponding length of the storage element series R, an EXOR gate $EXOR_{p1,p2,p3,p4}$ is inserted between a storage element $FF_{1,2,3,4}$ and the next storage element $FF_{2,3,4,5}$ in the series R at several points in this storage element series, and then supplied with a signal from a third storage element $FF_{8,15,20,23}$, the respective code generated as a result is changed (FIG. 2).

Given a plurality of code-changing EXOR gates $EXOR_{p1,p2,p3,p4}$ (see FIG. 2), the object is to ensure that the various code-changing EXOR gates $EXOR_{p1,p2,p3,p4}$, whose first input is supplied from an output of a storage element $FF_{1,2,3,4}$, get their second input supplied from the respective output of a storage element $FF_{8,15,20,23}$, which is spaced a number of storage elements in the conducting direction away from the initially mentioned storage element $FF_{1,2,3,4}$, wherein the number each corresponds to a different prime number that is greater than 1, but not a partial amount of the total number of storage elements connected in series R, so that no code sequence-shortening resonance effects come about while influencing the code sequence. Therefore, a respective number of 7, 13, 17 and 19 (prime numbers) of storage elements lie between the corresponding storage element pairs $FF_{1,8}$; $FF_{2,15}$; $FF_{3,20}$; $FF_{4,23}$.

Connecting the output 4 of an AND gate $AND_{p1}$ or $AND_{p1,p2,p3,p4}$ whose one input 6 is suspended at the output of the storage element $FF_3$ or $FF_{8,15,20,23}$ to one of the two inputs 2 of the respective EXOR gate $EXOR_{p1}$ or $EXOR_{p1,p2,p3,p4}$ makes it possible to enable or disable this EXOR gate $EXOR_{p1}$ or $EXPOR_{p1,p2,p3,p4}$ in terms of its code-changing action via the second input 5 of the AND gate $AND_{p1}$ or $AND_{p1,p2,p3,p4}$, and connecting another respective storage element $FF_{p1}$ or $FF_{p1,p2,p3,p4}$ thereto makes it possible to program the enabling and disabling of code-influencing action of the EXOR gate $EXOR_{p1}$ or $EXOR_{p1,p2,p3,p4}$ (FIG. 1 or FIG. 2). The code-programming storage elements $FF_{p1,p2,p3,p4}$ can here be interconnected in a series RR. The code-programming storage elements $FF_{p1,p2,p3,p4}$ can subsequently be in turn recursively interconnected with the help of an EXOR gate $EXOR_{pp1}$.

The number of programmable different codes is calculated as follows:

$$L_c = 2^{pn} - 1$$

($L_c$=number of possible different codes; $p_n$=number of programmable EXOR gates $EXOR_{p1,p2,...pn}$)

If an identical code generator is now available, and the goal is to ascertain the further progression of the code sequence based on a specific number of bits, the probability that the correct continuation of the code sequence will be recognized depends both on the number of storage elements $FF_{1,2,...n}$ used for generating the code, and on the number of programmable, code-changing EXOR gates $EXOR_{p1,p2,...pn}$. This yields the following probability of discovering the programming underlying the code, and hence of predicting the further progression of the code:

$$W = \frac{N_b}{(2^n - 1) \cdot (2^{pn} - 1)}$$

($N_b$=number of observed code sequence bits; n=number of code-generating, series-connected storage elements $FF_{1,2,...n}$; $p_n$=number of programmable, code-changing EXOR gates $EXOR_{p1,p2,...pn}$)

233 is the $52^{nd}$ prime number. If the 1 is not used and 233 expresses the total number of series-connected storage elements, there are 50 different storage elements along this segment, which each are spaced a distance away from the output storage element equal to a prime number ($n_p$=233+50=283).

As a consequence:

$$W = \frac{N_b}{(2^n - 1) \cdot (2^{pn} - 1)} = \frac{N_b}{(2^{283} - 1) \cdot (2^{50} - 1)}$$

$$W = \frac{N_b}{(1,5541351138 \cdot 10^{85} - 1) \cdot (1,1258999068 \cdot 10^{15} - 1)}$$

$$W = \frac{N_b}{1,7498005798 \cdot 10^{100}}$$

In other words, the code sequence must be observed for $1.7498005798*10^{100}$ clock increments for the probability of detecting a specific sequence to equal 1. At a clock frequency of 384000 Hz, this yields a necessary observation period of $1.4449430312*10^{87}$ years.

Recursively interconnecting the code-programming storage elements ($FF_{p1,p2,p3,p4,p5,p6}$) so that they run through all possible state combinations within the time interval $$T_{pn} = \frac{2^{pn} - 1}{f_p}$$

(T pn=run time for all possible programming states; pn=number of program storage elements; $f_p$=programming clock frequency)

yields the programming from a specific time range, in which the code-programming storage elements are supplied with a program clock, so that simultaneously activating and deactivating the program clock at two identical code generators (activation pulse and deactivation pulse at pin 12 of IC 10a in circuit on FIG. 2) makes it possible to execute it in such a way that several code generators generate identical code sequences, but the programming content is not known, even to the programmers.

Figure 3:
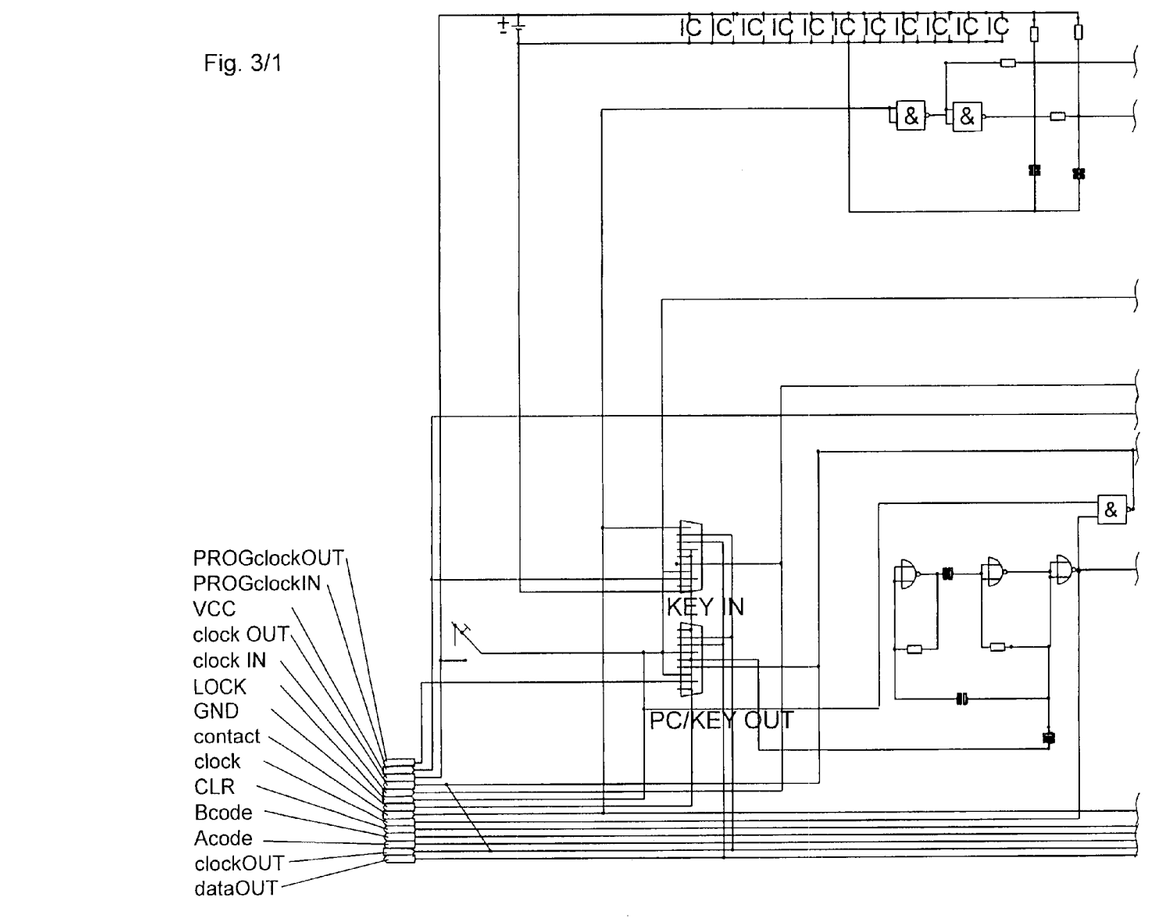
FIG. 3 is a general example of a circuit for a modified code generator.

Programming can take place in two stages to prevent the programming from being even approximately gleaned from the programming duration. To this end, another programming level can be added by connecting the code-programming EXOR gate $EXOR_{pp1}$ itself with a storage element series RRR, again inserting an AND gate $AND_{pp1}$, hence making it programmable, wherein an EXOR gate $EXOR_{ppp1}$ is again used for recursively interconnecting the series RRR (FIG. 3).

In the first programming stage, the programmer is programmed not to search for a segment of the possible programming states, which then represents the starting point for subsequent programming at which all points in such a segment can be looked up.

Proceeding from the above computing example, this ensures that the $(2^{283}-1)*(2^{50}-1)$ different states are divided into $2^{50}-1$ different segments, of which one is selected in the first programming phase. This selection process takes place in a maximum of $2^{ppn}-1$ steps (ppn=number of prime numbers contained in the number of prime numbers (50) used in programming, thus 16). This means that a maximum of $2^{16}$ steps must take place before all segments are searched. At a programming clock frequency of 1 MHz, this process is completed in 0.065 seconds. A time surely covered in any programming process, since it lies under the reaction time of humans, thereby ensuring that no inferences to the key programming can be derived from the actually transpired programming period.

Two related, but dissimilar codes can be derived from one by assigning one of two sister codes only to every second state of a mother code.

The output signal is coded via an EXNOR gate (IC 17*b*, *c*, FIG. 2), whose one input incorporates the signal to be encrypted, and whose second input incorporates the code, so that the code-encrypted output signal appears at its output.

The input signal is decoded via an EXNOR gate, whose one input incorporates the signal to be decrypted, and whose second input incorporates the code, so that the code-decrypted output signal appears at its output.

Using at least two such identically programmed code generators makes it possible to identify a second owner of the same code generator, and subsequently synchronize the code generators to establish a stable, encrypted data transmission circuit with this party over which live data can be permanently exchanged.

Since the circuit does not take up any CPU time during code generation itself, it is independent of any handshake time, and hence limited in its code production rate solely by the specific switching times of the electronic components comprising it. In this way, commercially available TTL components can be used to easily realize code production rates in the megahertz range.

In the following section, the inner operational sequence of the circuit according to FIG. 2 will be described step-by-step, wherein the term "key" is used for the functional unit according to the circuit on FIG. 2:

| ACTION | REACTION | FUNCTION |
|---|---|---|
| 1.) The computer and key output of key A is connected to the key input of key B | The respective contact inputs are set to LOW in both keys A and B | Code production is set in keys A and B. Key A is operated by its own clock. The clock is transmitted from key A to key B. |
| 2.) The lock key (lock OFF/lock ON) of key B is actuated for the first time | The lock OFF signal is relayed from key A to key B. A CLR signal is derived in both keys | All shift registers in both keys are cleared |
| 3.) | The clock is supplied to the programming section from both keys A and B | Programming is concurrent and synchronous in both keys, but without any direct transmission of program content from key A to key B |
| 4.) The lock key of key A is actuated again | The clock is no longer supplied to the programming section from both keys A and B | Synchronous programming stop |
| 5.) The two keys are separated | The respective contact inputs are set to HIGH in both keys A and B | Code production can now be synchronously started in both keys A and B. |

Inner operational sequence of circuit

The section below describes the step-by-step operational sequence for establishing an encrypted connection between two computers with two functional units according to the circuit on FIG. 2:

Overview of possible operational sequences

| MODE | Identification mode | Synchronization mode | Synchronous mode |
|---|---|---|---|
| CODE | X | X | X |
| ADDRESS | | X | X |
| TIME | | | X |
| Identify | X | | |
| Synchronize | X | X | |
| Decode | X | X | X |

| (A) | (B) | PHASE | ACTIONS | KEY (A) | KEY (B) |
|---|---|---|---|---|---|
| | | | Identification mode | | |
| −x | −x | Programming | Computer/key output of key (A) is connected with key input of key (B) | Key (A) is programmed, is assigned code C1 as send code and code C2 as receive code | Key (B) is programmed, is assigned code C2 as send code and code C1 as receive code |
| 0 | 0 | Separation | Key (A) is removed from key (B) | Key (A) is mute | Key (B) is mute |
| 0 | 0 | Key activation (A) | | Key (A) is connected with a computer | |
| 0 | 0 | | | An e-mail is written on the computer of key (A) | |
| 0+ 1000+ E-mail | 0 | Code packet call (A, 1000+ e-mail) | | The e-mail is coded (live) with C1, wherein a sequence of 1000 empty code bits including code generation time is appended in front of the e-mail uncoded | |
| 0+ 1000+ E-mail | 0 | Data transfer | | The e-mail is sent to the homepage on the computer of key (A) and displayed there | |
| 0+ 1000+ E-mail | 0 | Key activation (B) | | | Key (B) is connected with a computer |
| 0+ 1000+ E-mail | 0+ 1000 | Code packet call (B, 1000) | | | A 1000 bit sequence of code C1 is read out of key (B) and transferred to a search engine |
| 0+ 1000+ E-mail | 0+ 1000 | | | | If the homepage of key (A) is detected, the e-mail is called |
| 0+ 1000+ E-mail | 0+ 1000+ E-mail | Code packet call (B, e-mail) | | | Key (B) (asynchronously) decodes the signal of key (A) via C1 |
| 0+ 1000+ E-mail | A | Free-flowing code (B) | | | Key (B) now continuously generates code |
| 0+ 1000+ E-mail | A | | | | Key (B) now knows where to find key (A), and can establish a connection with it for purposes of synchronization |
| | | | Synchronization mode | | |
| B | 0 | | | | The e-mail is called from the server of key (B) |
| C | 0+ 1000 | Code packet call (B, 1000) | | | Key (B) compares the 1000 bit sequence from key (A) with its C1, and shifts it until synchronicity exists (discernible from the empty 1000 bit); (synchronously) decodes the signal from key (A) via C1; result: empty |
| D | 0+ 1000+ E-mail | Code packet call (B, e-mail) | | | Key (B) decodes (synchronizes) the content in the message from (A) via C1 |
| E | E | Free-flowing code (A, B) | | | Key (B) now knows where key (A) is on the time axis, so that it can now send code |

-continued

| (A) | (B) | PHASE | ACTIONS | KEY (A) | KEY (B) |
|---|---|---|---|---|---|
| | | | | | synchronously with it, and as such switch in the synchronous mode |
| E+ 1000 | E+ 1000 | | | Key (A) decodes the signal of key (B) (live) via C2; result: empty | Key (B) decodes the signal of key (A) (live) via C1; result: empty |
| F+ message duration | F+ message duration | Data transfer | A content is supplied to key (A) | Key (A) codes the message content (live) via C1 | Key (B) decodes the message content of (A) (live) via C1 |
| G+ message duration | G+ message duration | | A content is supplied to key (B) | Key (A) decodes the message content of key (B) (live) via C2 | Key (B) codes the message content (live) via C2 |

I claim:

1. A code generator comprising a plurality of storage elements connected in a code-producing series, wherein the output of the last storage element in the series is linked with the input of the first storage element in the series to form a circuit, and outputs and inputs of the storage elements are recursively interconnected with EXOR gates inserted, characterized in that the output of a storage element located in the code-producing series is connected with the input of an inverter, and the output of the inverter is connected with the input of another storage element arranged in the code-producing series, wherein the EXOR gates comprise a plurality of first EXOR gates, each of whose first input is supplied by a respective output of one of the storage elements located in the code-producing series, and whose second input is supplied by the respective output of another storage element located in the code producing series, which is spaced a number of storage elements in the conducting direction of the series away from the storage element respectively connected with the first input, which respectively corresponds to a different prime number that is greater than 1.

2. The code generator according to claim 1, wherein an AND gate is connected in a line connecting the second input of at least one first EXOR gate and the output of the other storage element located in the code-producing series, so that the output of the AND gate is connected with the second input of the first EXOR gate, the first input of the AND gate is connected with the output of the other storage element located in the code-producing series, and the second input of the AND gate is connected with the output of a code-programming storage element.

3. A code generator comprising a plurality of storage elements connected in a code-producing series, wherein the output of the last storage element in the series is linked with the input of the first storage element in the series to form a circuit, and outputs and inputs of the storage elements are recursively interconnected with EXOR gates inserted, characterized in that at least one first EXOR gate is provided, whose first input is connected with the output of a storage element located in the code-producing series, whose second input is connected with the output of another storage element located in the code-producing series and whose output is connected with the input of the storage element following the storage element connected with the first input of the first EXOR gate in the code-producing series, and that the output of a storage element located in the code-producing series is connected with the input of an inverter, and the output of the inverter is connected with the input of another storage element arranged in the code-producing series, wherein a plurality of code-programming storage elements that are respectively assigned to an AND gate and the at least one first EXOR gate is provided and connected in a series comprising a closed circuit, and at least one second EXOR gate is provided whose first input is connected with the output of a storage element located in the code-programming series, whose second input is connected with the output of another storage element located in the code-programming series, and whose output is connected with the input of the storage element following the storage element connected with the first input of the second EXOR gate in the code-programming series.

4. The code generator according to claim 3, wherein each AND gate is connected in a line connecting the second input of the corresponding at least one first EXOR gate and the output of the other storage element located in the code-producing series and associated with the corresponding first EXOR gate, so that the output of each AND gate is connected with the second input of the corresponding first EXOR gate, the first input of each AND gate is connected with the output of the other storage element located in the code-producing series and associated with the corresponding first EXOR gate, and the second input of each AND gate is connected with the output of a storage element used for programming the code-programming series.

5. The code generator according to claim 1, wherein a plurality of storage elements used to program the code programming series that are respectively assigned to an AND gate and the at least one first EXOR gate is provided and connected in a series comprising a closed circuit, and at least one second EXOR gate is provided whose first input is connected with the output of a storage element located in the code-programming series, whose second input is connected with the output of another storage element located in the code-programming series, and whose output is connected with the input of the storage element following the storage element in the code-programming series connected with the first input of the second EXOR gate.

6. The code generator according to claim 1, further comprising at least one connection for at least a second, identically structured code generator, so that both code generators can be supplied with the same program clock at the same time.

7. A device for sending and receiving encrypted information comprising at feast two code generators according to claim 1, wherein the code generators each have at least one connection for simultaneously supplying the code-programming storage elements of all interconnected code generators with the same program clock, so that the code-programming storage elements of all interconnected code generators simultaneously run through all possible state combinations, and are provided with the same programming when the code generators are simultaneously separated from the program clock.

8. The device according to claim 7, wherein the code generators each includes two connections for simultaneously supplying the code-programming storage elements and the storage elements used to program the code-programming storage elements of all interconnected code generators have two independently running program clocks, wherein the storage elements used to program the code-programming storage elements run through all possible state combinations at least once, and the code-programming storage elements of all interconnected code generators simultaneously run through a specific number of all possible state combinations, and that all interconnected code generators are provided with the same programming after the simultaneous separation of code generators from the program clocks.

9. The code generator according to claim 1, wherein respective outputs of the first EXOR gates are connected with the input of the storage element following the storage element connected with the first input of the respective first EXOR gate in the code-producing series.

10. A code generator comprising:
storage elements arranged in a code-producing series in which an output of a last storage element in the series is coupled to an input of a first storage element in the series;
two or more EXOR gates, each EXOR gate including first and second inputs respectively coupled to outputs of first and second corresponding storage elements, and an output coupled to an input of a third corresponding storage element; and
an inverter coupled between an output of one storage element and an input of another storage element,
wherein the first and second storage elements corresponding to each of the two or more EXOR gates are spaced apart from each other in the code-producing series by respective different numbers of storage elements, each of the respective different numbers being a prime number.

11. The code generator according to claim 10, further comprising:
logic gates respectively associated with each of the two or more EXOR gates, each logic gate including a first input coupled to the output of the second storage element corresponding to the associated EXOR gate and an output coupled to the second input of the associated EXOR gate.

12. The code generator according to claim 11, wherein each logic gate includes a second input coupled to an output of a corresponding code-programming storage element.

13. The code generator according to claim 10, further comprising:
one or more circuits for selectively enabling and disabling one or more of the EXOR gates.

14. The code generator according to claim 10, wherein the third storage element corresponding to one of the EXOR gates is the storage element in the code-producing series immediately following the first storage element corresponding to that same one of the EXOR gates.

15. A code generator comprising:
storage elements arranged in a code-producing series in which an output of a last storage element in the series is coupled to an input of a first storage element in the series;
two or more EXOR gates, each EXOR gate including first and second inputs respectively coupled to outputs of first and second corresponding storage elements, and an output coupled to an input of a third corresponding storage element; and
an inverter coupled between an output of one storage element and an input of another storage element,
wherein the number of storage elements in the code-producing series is a prime number.

16. A system comprising one or more code generators according to claim 10.

17. A code generator comprising:
storage elements arranged in a code-producing series in which an output of a last storage element in the series is coupled to an input of a first storage element in the series; and
two or more logic gates, the logic gates including an EXOR and an EXNOR gate each of which includes first and second inputs respectively coupled to outputs of first and second corresponding storage elements and an output coupled to an input of a third corresponding storage element,
wherein the number of storage elements in the code-producing series is a prime number.

18. A system comprising one or more code generators according to claim 17.

19. The code generator according to claim 1, wherein the different prime number that is greater than 1 does not constitute a partial amount of the overall number of storage element connected in series.

* * * * *